(12) United States Patent
Drake

(10) Patent No.: US 6,354,116 B1
(45) Date of Patent: Mar. 12, 2002

(54) VALVE COVER FOR PREVENTING UNAUTHORIZED TAMPERING WITH A VALVE

(76) Inventor: Robert R. Drake, 19265 N. 78th La., Glendale, AZ (US) 85308

( * ) Notice: Subject to any disclaimer, the term of this patent is extended or adjusted under 35 U.S.C. 154(b) by 0 days.

(21) Appl. No.: 09/549,304

(22) Filed: Apr. 13, 2000

(51) Int. Cl.⁷ .............................................. F16K 35/00
(52) U.S. Cl. ............................ 70/178; 70/180; 70/232; 137/382
(58) Field of Search ......................... 70/175–180, 232, 70/198–200; 137/382, 383, 384.2, 385

(56) References Cited

U.S. PATENT DOCUMENTS

| | | | | |
|---|---|---|---|---|
| 1,380,675 A | * | 6/1921 | Myers | 70/176 X |
| 1,683,649 A | * | 9/1928 | Belote | 70/178 X |
| 1,903,581 A | * | 4/1933 | Turner | 70/178 X |
| 1,920,128 A | * | 7/1933 | Mickler | 70/178 X |
| 1,986,128 A | * | 1/1935 | Trott | 70/178 X |
| 2,094,773 A | * | 10/1937 | Cohick | 70/178 |
| 2,623,380 A | * | 12/1952 | Lee | 70/178 |
| 2,924,960 A | * | 2/1960 | Palazzo | 70/180 |
| 3,406,708 A | * | 10/1968 | Maydock | 137/382 |
| 4,422,314 A | * | 12/1983 | Cooper | 70/178 X |
| 4,630,456 A | * | 12/1986 | Nielsen, Jr. | 70/232 |
| 4,662,196 A | * | 5/1987 | Michon | 70/177 |
| 4,872,327 A | * | 10/1989 | Wagner | 70/175 |
| 5,353,833 A | * | 10/1994 | Martinez | 70/177 X |
| 5,375,916 A | * | 12/1994 | Cook | 70/177 X |
| 5,873,271 A | * | 2/1999 | Smith | 70/232 X |
| 5,887,460 A | * | 3/1999 | Williams | 70/18 |
| 6,112,761 A | * | 9/2000 | Scotto | 70/178 X |
| 6,131,424 A | * | 10/2000 | Dixon | 70/198 |
| 6,152,161 A | * | 11/2000 | Yokota et al. | 70/178 X |

\* cited by examiner

Primary Examiner—Suzanne Dino Barrett
(74) Attorney, Agent, or Firm—Drummond & Duckworth

(57) ABSTRACT

A valve cover apparatus is provided having a housing, lock and hook. The housing includes a top wall, bottom wall and a plurality of sidewalls. The bottom wall includes an opening to a central chamber of the housing which is sized for receipt of a valve handle and valve stem of a pipe valve. Preferably, the sidewalls include one or more inlets for receipt of the pipe's conduit. The lock is affixed and integrated into the top wall of the housing and constructed to lockably engage and disengage the hook. The hooks includes a vertically extending shaft and one or more shanks. The shanks extend horizontally under a pipe valve to inhibit upward movement of the hook once the hook has been positioned in place.

2 Claims, 2 Drawing Sheets

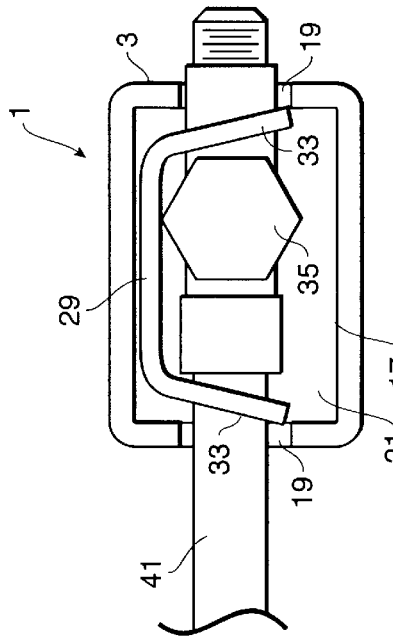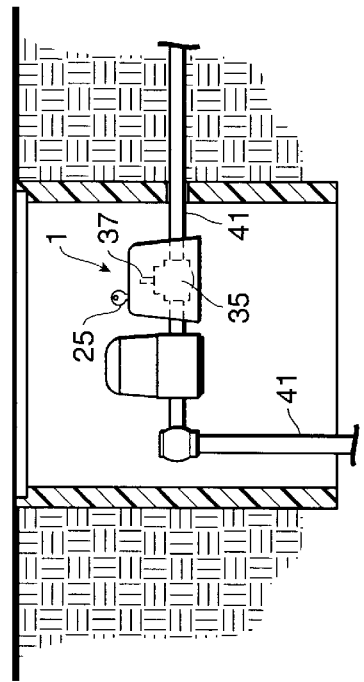
FIG. 2
FIG. 3
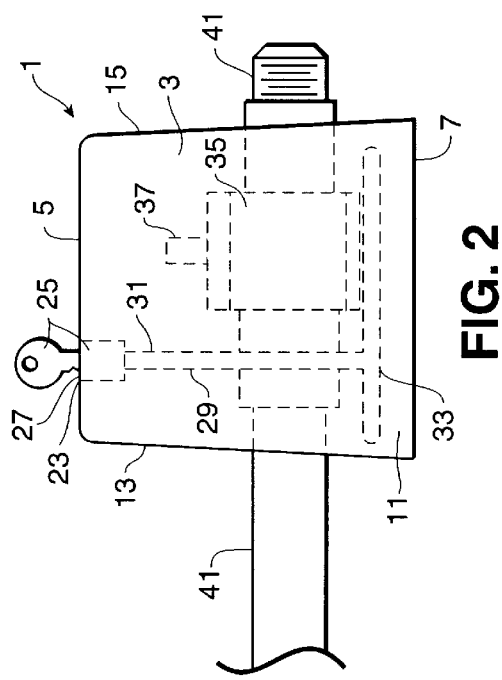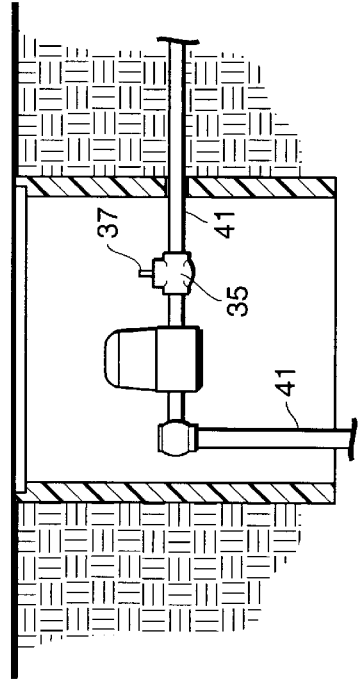
FIG. 4
FIG. 5

VALVE COVER FOR PREVENTING UNAUTHORIZED TAMPERING WITH A VALVE

BACKGROUND OF THE INVENTION

The present invention relates to devices for locking a valve attached to a pipe conduit.

Even more particularly, the invention relates to a detachable valve cover apparatus for valves commonly used in connection with gas and liquid pipe conduits for maintaining the valve in either an open or a closed condition, and for preventing unauthorized tampering with the valve.

Many public utility companies deliver water and gas to homes from common pipe conduits. The gas and water are then fed through feeder lines to the home. Generally, each feeder line includes a valve which controls the flow to and from the home. However, it is often desirable to shut off the flow of water or gas into the home, for example when the home owner or business owner does not pay his bill or when the continued flow of gas or water poses a dangerous condition, such as after an earthquake or fire. Unfortunately, home owners or business owners often turn the valve back to an open condition, notwithstanding the lack of payment of a bill or the fact that the dangerous condition may still continue. Thus, it is not only dangerous to life and property to permit unauthorized opening and closing of pipe valves, but the unauthorized and uncontrolled flow or gas and water may be lost in great quantities by the utility company's furnishing such gas or water.

Valves are typically actuated by rotation of a valve stem and valve handle. Valve handles are typically oval shaped, T-shaped or include several spokes with a circular rim, and are often removable so that they may be removed to inhibit unauthorized actuation of the pipe valve. Rotation of the handle in a first direction causes the valve to open, while rotation of the handle in the opposite direction causes the valve to close. To maintain the valve in an open or closed position, and to prevent unauthorized tampering with the valve, locking protective covers are often provided which prevent those without authorization from accessing the valve stem or valve handle. For example, U.S. Pat. Nos. 4,208,893; 5,092,359; 4,630,456 and 3,156,256 are all directed to valve locks which include a housing for guarding or encapsulating the valve stem and valve handle of a pipe valve against unauthorized use. Unfortunately, each of these locking apparatus suffer from significant disadvantages. For example, U.S. Pat. No. 4,630,456 discloses a clamshell-type apparatus in which the upper and lower portions of a housing form respective clamshell members which operate to close upon and encapsulate a pipe valve. Unfortunately, the pipe and pipe valve which are sought to be controlled are often located within a hole in the ground, and often positioned such that the underside of the pipe is positioned very close to the ground which makes it very difficult to position the valve locks lower clamshell member below the pipe.

Recently, attempts have been made to overcome this disadvantage by eliminating a lower clamshell member and utilizing a hook which hooks under the pipe valve. The hook then attaches to the housing of the valve lock which maintains the housing in a fixed position encapsulating the valve stem and handle of the pipe valve. Unfortunately, such devices have positioned the controller for the lock, such as the dial combination or key hole of a lock, in the housing's sidewall which makes it very difficult to open or close the lock when it is positioned within a hole.

Thus, it would be highly desirable to provide an improved valve lock which can be easily attached and removed from a pipe valve.

It would also be highly desirable to provide a valve lock which is inexpensive to manufacture and easy to operate.

SUMMARY OF THE INVENTION

The present invention addresses the aforementioned disadvantages by providing an improved valve cover for inhibiting the rotation of the valve stem and valve handle of a pipe valve. The valve cover includes a housing having a top wall and a plurality of sidewalls. Preferably, the housing includes four sidewalls forming a central chamber. The bottom of the housing is substantially open, or includes an opening, configured for receiving the valve stem within the housing's central chamber. In a preferred embodiment, the housing includes one or more inlets in the housing's sidewalls which are sized and configured for receiving the pipe conduit. Upon positioning the housing of the valve cover over the pipe valve's valve stem and valve handle, with the pipe conduit positioned within the sidewall's inlets, unauthorized manipulation or operating of the valve is restricted until the housing is removed.

The valve cover of the present invention further includes a lock controllable by a lock controller of the type typically known to those skilled in the art. For example, the lock may be a combination lock with the dial of the combination lock operating as a lock controller for controlling the locking and unlocking of the lock. In the alternative, the lock may be key operated, with the key and tumblers of the lock functioning to control the locking and unlocking of the lock. The lock may also take various other forms as would be understood by those skilled in the art.

Preferably, the lock is integrated and affixed to the top wall of the valve cover's housing with the lock controller, such as the dial of a combination lock, positioned to face upwardly from the housing's top wall. This construction permits one to easily access the lock controller to open or close the lock when the valve cover is positioned within the ground as the valve cover will typically be positioned to face upwardly above the pipe conduit.

The valve cover of the present invention further includes a hook which detachably connects to the lock. The lock controller controls operation of the lock to selectively engage and affix the hook to the lock, and to selectively disengage the hook from the lock. The hook is formed with a vertically extending shaft with the upper extremity of the shaft constructed to engage and lock the lock. Meanwhile, at the lower extremity of the shaft, the hook includes one or more laterally extending shanks.

To position the valve cover over a pipe valve, and thereby inhibit unauthorized actuation of the pipe valve., the hook is disengaged from the rest of the valve cover and positioned so that the vertically extending shaft extends adjacent to the handle of a pipe valve with the shanks positioned to project under the pipe conduit. The housing is then lowered upon the pipe valve so as to encapsulate the pipe valve's valve stem within the housing's central chamber. The housing is positioned so that the lock engages the upper extremity of the hook's shaft and the lock controller is manually manipulated to engage and affix the hook to the lock. Once positioned in this manner, upward removal of the valve cover from the pipe valve is inhibited by the hook's shanks engaging the underside of the pipe conduit.

It is thus an object of the present invention to provide a valve cover that may be easily and quickly installed on a pipe valve.

It is an additional object of the invention to provide a valve cover which can be installed on pipe valves of different sizes and shapes.

Still a further object of the invention is to provide a valve cover that is inexpensive to manufacture and durable in use.

Another object of the present invention is to provide a valve cover that can be installed on pipe valves where typical clamshell valve locks can not be installed.

Other features and advantages of the present invention will be appreciated by those skilled in the art upon reading the detailed description which follows with reference to the attached drawings.

BRIEF DESCRIPTION OF THE DRAWINGS

These and other features, aspects and advantages of the present invention will be become better understood with regard to the following description, appended claims and accompanying drawings where:

FIG. 2 is a side view of the valve cover of the present invention covering a pipe valve;

FIG. 3 is a bottom view of the valve cover of the present invention illustrating the valve cover covering a pipe valve;

FIG. 4 is a side view of a pipe valve located within a ground hole; and

FIG. 5 is a front view of the valve cover of the present invention covering the pipe valve shown in FIG. 4.

DETAILED DESCRIPTION OF THE INVENTION

Figure 1:
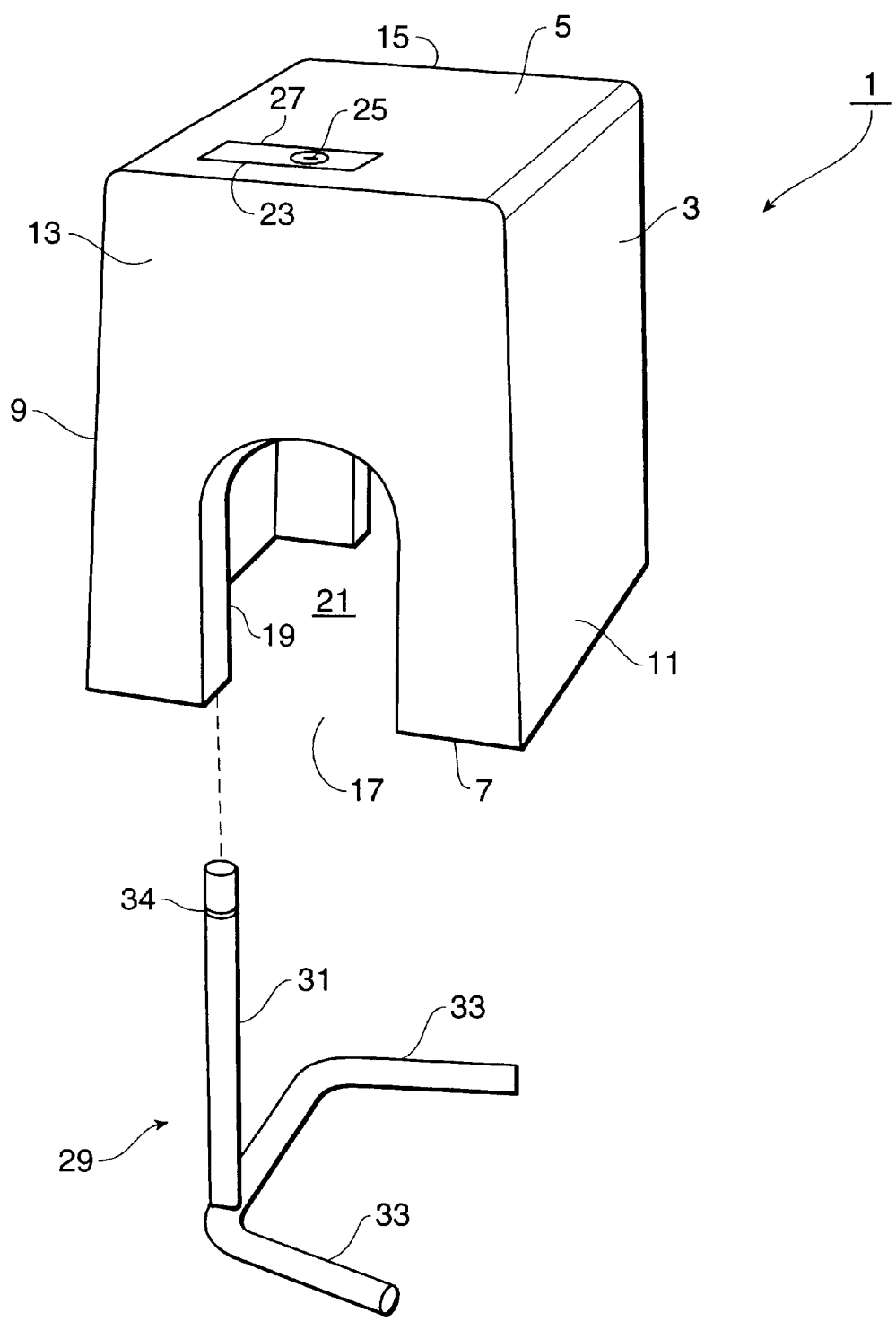
FIG. 1 is an exploded elevational view of the valve cover of the present invention.

While the present invention is susceptible of embodiment in various forms, there is shown in the drawings and will hereinafter be described the presently preferred embodiments of the invention with the understanding that the present disclosure is to be considered as an exemplification of the invention and it is not intended to limit the invention to the specific embodiments illustrated.

As shown in the figures, the valve cover 1 of the present invention predominantly consists of three parts, a housing 3, a lock 23 and a hook 29. The housing 3 includes a top wall 5, a bottom wall 7 and a plurality of sidewalls. Preferably, the housing 3 is rectangular shaped, thus having four walls including a left wall 9, a right wall 11, a front wall 13 and a rear wall 15. The housing 3 may be manufactured of numerous materials known to those skilled in the art, such as hard durable plastics, or metals including steel and aluminum. However, it is preferred that the housing 3 be manufactured of multiple layers of resin bonded Kevlar, graphite and fiberglass, or combinations of these. These materials can be quickly and easily formed to the desired shape of the housing 3 in a mold, and are far more durable and impervious to tampering than the more common materials.

The bottom 7 of the housing 3 includes an opening 17 which is sufficiently large to accept receipt of the valve stem 37 of the pipe valve 35 which is sought to be protected. The housing 3 preferably also includes one or more inlets 19 which are formed in the housing's sidewalls. The inlets 19 are cutouts in the bottom extremities of the sidewalls which are sized, configured and positioned to accept the pipe conduit 41 adjacent to the pipe valve 35.

The lock 23 of the valve cover apparatus 1 is of the type commonly known to those skilled in the art, including for example, key locks, combination locks, etc. For purposes herein, the dial of a combination lock or keyhole and tumblers for a key lock, or other means for manipulating the actuation of a lock are referred to herein as a lock controller. The lock 23 of the valve cover 1 of the present invention is integrated and affixed to the top wall 5 of the housing 3 so that unauthorized removal or misplacement of the lock 23 is difficult or impossible. Moreover, the lock 23 is positioned within or adjacent to the top wall 5 so that the lock controller 25 faces upwardly to facilitate access to the lock controller 25 when one is accessing the valve cover 1 from above.

The valve cover 1 of the present invention further includes a hook 29 which is positioned within the housing's central chamber 21. The hook 29 includes a vertically extending shaft 31 and one or more horizontally extending shanks 33. The upper extremity of the shaft 31 is constructed to selectively engage and lock to the lock 23. The engagement and locking of the upper extremity of the shaft 31 can be accomplished by any manner of means commonly known to those skilled in the art. For example, the lock 23 and shaft 31 may be constructed to lock together wherein the upper extremity of the shaft 31 includes a radially projecting detent 34 and the lock 23 includes a vertically extending bore sized for receipt of the shaft 31. Upon positioning the shaft 31 within the lock's bore, engagement and disengagement can be controlled by a movable lock tooth (not shown) projecting inwardly from the bore sidewall into the shaft detent 34.

The hook's one or more shanks 33 are positioned at the lower extremity of the shaft 31 and constructed to extend horizontally. The shanks 33 are sized and configured to project under the pipe conduit 41 below the valve stem 37. Preferably, the hook 29 includes one or more shanks 33. As shown in FIGS. 2 and 3, the hook 29 includes two shanks projecting under the pipe conduit on each side of a valve stem 37.

To use the valve cover 1 of the present invention to inhibit unauthorized actuation of a pipe valve, the hook 29 is disengaged from the lock 23. As shown in FIGS. 2, 3 and 5, the hook 29 is then positioned so that the shaft 31 extends upwardly and the shank 33 is positioned under the pipe conduit 41, and partially surrounds the pipe valve 35. Of importance, the shanks 33 are positioned under the pipe conduit 41 so that upward movement of the hook 29 is restricted upon engagement of the shanks 33 with the pipe valve 41 or pipe valve 35.

The housing 3 of the valve cover 1 is then lowered upon the pipe valve 35 so that the valve stem 37 is received and encapsulated within the housing's central chamber 21, and the pipe conduit 41 is received within the sidewall inlets 19. The upper extremity of the hook 29 is engaged and locked to the lock 23 so that unauthorized removal of the housing 3 is restricted. Once positioned in this manner, removal of the valve cover 1 can only be accomplished by use of the appropriate key or appropriate combination with the lock controller 25 which is disposed within the housing's top wall 5.

Although particular preferred embodiments of the invention have been described herein, it is to be understood that variations may be made in the construction, materials and shape of the valve cover apparatus without departing from the spirit and scope of the invention.

Having described the invention in such terms to enable those skilled in the art to make and use it, and having identified the presently preferred embodiments thereof, I claim:

1. A valve cover for inhibiting the actuation of a pipe valve affixed to a pipe conduit, said valve cover comprising:
   a hollow housing having a top, a bottom and a plurality of sides forming a central chamber, said bottom including an opening for at least partially receiving a pipe valve within said central chamber;

a lock means including a lock controller for controlling the locking and unlocking of said lock means, said lock means being integrated to and permanently affixed to said housing top when locking and unlocking said lock means and constructed so that said lock controller faces upwardly so as to be accessed from directly above; and a hook detachably connected to said lock means, with said lock controller controlling the locking engagement and disengagement of said hook with said lock means, said hook including a vertically extending shaft constructed to descend from said locking means to below the pipe conduit, and one or more horizontally extending shanks configured to project under the pipe conduit when the valve cover is positioned to inhibit actuation of the pipe valve;

said housing, lock means and hook constructed so that said valve cover can be locked to said to a pipe valve with the pipe valve locked in either an open valve condition or a closed valve condition.

2. The valve cover of claim 1 wherein the plurality of sides includes one or more inlets configured for receipt of the pipe conduit.

* * * * *